United States Patent
March Nomen et al.

(10) Patent No.: US 10,753,341 B2
(45) Date of Patent: Aug. 25, 2020

(54) LIGHTNING SYSTEM FOR WIND TURBINE BLADES WITH OPTIMIZED MEANS FOR INJECTING LIGHTNING CURRENTS IN CONDUCTIVE COMPONENTS OF THEIR SHELLS

(71) Applicant: GAMESA INNOVATION & TECHNOLOGY, S. L., Sarriguren (Navarra) (ES)

(72) Inventors: Victor March Nomen, Sarriguren (ES); Juan Madoz Zabalegui, Sarriguren (ES)

(73) Assignee: SIEMENS GAMESA RENEWABLE ENERGY INNOVATION & TECHNOLOGY, S.L., Sarriguren (ES)

(*) Notice: Subject to any disclaimer, the term of this patent is extended or adjusted under 35 U.S.C. 154(b) by 415 days.

(21) Appl. No.: 15/609,685

(22) Filed: May 31, 2017

(65) Prior Publication Data
US 2017/0350374 A1 Dec. 7, 2017

(30) Foreign Application Priority Data
Jun. 7, 2016 (ES) .................................. 201600471

(51) Int. Cl.
*F03D 80/30* (2016.01)
*F03D 1/06* (2006.01)
(Continued)

(52) U.S. Cl.
CPC .......... *F03D 80/30* (2016.05); *F03D 1/0675* (2013.01); *H01C 7/12* (2013.01); *H01T 1/16* (2013.01);
(Continued)

(58) Field of Classification Search
CPC .......... F03D 80/30; F03D 80/40; F03D 9/065; F03D 1/0675; F03D 1/06; F03D 13/00;
(Continued)

(56) References Cited

U.S. PATENT DOCUMENTS 8,517,681 B2 * 8/2013 Naka ....................... F03D 80/30
416/1
2008/0073098 A1 * 3/2008 Llorente Gonzalez ..................... B82Y 30/00
174/2
(Continued)

FOREIGN PATENT DOCUMENTS

CN 103329379 A 9/2013
DE 44 45 899 A1 6/1996
(Continued)

OTHER PUBLICATIONS

Espacenet English abstract of DE 44 45 899 A1.
Espacenet English abstract of JP 2010-59813 A.

*Primary Examiner* — Tuan T Dinh
(74) *Attorney, Agent, or Firm* — Ladas & Parry LLP

(57) ABSTRACT

The invention provides a lightning protection system for wind turbine blades with optimized injection means of lightning currents in conductive components of their shells. The injection means comprise a current receptor element (27; 47; 67) connected to the input cable of lightning currents and arranged over an area of a shell close to an electrically conductive component (22; 42; 62) and a current injection element (28; 48; 68; 69, 69') arranged over the electrically conductive component (22; 42; 62) and connected to the current receptor element (27; 47; 67) by at least two distribution cables (31, 32; 51, 52, 53; 71, 72, 73, 74).

5 Claims, 4 Drawing Sheets

(51) Int. Cl.
*H01C 7/12* (2006.01)
*H01T 1/16* (2006.01)
*H02G 13/00* (2006.01)

(52) U.S. Cl.
CPC ...... *H02G 13/80* (2013.01); *F05B 2280/2006* (2013.01); *H02G 13/40* (2013.01); *Y02E 10/721* (2013.01)

(58) Field of Classification Search
CPC . F03D 13/0025; F03D 13/0033; H02G 13/00; H02G 13/0065
USPC ..... 361/127, 117–118, 131, 218; 416/146 R, 416/241 R
See application file for complete search history.

(56) References Cited

U.S. PATENT DOCUMENTS

| | | | |
|---|---|---|---|
| 2009/0056968 A1* | 3/2009 | Bertelsen | H02G 13/00 174/2 |
| 2009/0257881 A1* | 10/2009 | Ostergaard Kristensen | F03D 80/30 416/229 R |
| 2010/0272570 A1* | 10/2010 | Arocena De La Rua | F03D 80/30 416/146 R |
| 2013/0028739 A1* | 1/2013 | Erichsen | F03D 80/30 416/146 R |
| 2013/0149153 A1 | 6/2013 | Fujioka et al. | |
| 2014/0093373 A1* | 4/2014 | Schmidt | G01R 19/15 416/61 |
| 2015/0098823 A1* | 4/2015 | Iriarte Eleta | F03D 80/40 416/146 R |
| 2015/0132133 A1* | 5/2015 | Lyngby | F03D 80/50 416/146 R |
| 2016/0138569 A1* | 5/2016 | Caruso | F03D 1/0675 416/241 R |
| 2016/0369781 A1* | 12/2016 | March Nomen | F03D 1/0675 |

FOREIGN PATENT DOCUMENTS

| | | |
|---|---|---|
| EP | 1 826 402 A1 | 8/2007 |
| EP | 2 930 355 A1 | 10/2015 |
| EP | 2 649 690 B1 | 3/2016 |
| JP | 2010-59813 A | 3/2010 |
| WO | 2005/026538 A1 | 3/2005 |
| WO | 2005/050808 A1 | 6/2005 |
| WO | 2006/051147 A1 | 5/2006 |
| WO | 2 458 207 A2 | 5/2012 |

* cited by examiner

_(10) Patent No.: US 10,753,341 B2_

LIGHTNING SYSTEM FOR WIND TURBINE BLADES WITH OPTIMIZED MEANS FOR INJECTING LIGHTNING CURRENTS IN CONDUCTIVE COMPONENTS OF THEIR SHELLS

FIELD OF THE INVENTION

The invention relates to a lightning protection system for wind turbine blades with electrically conductive components in their shells and in particular to the injection of lightning currents in said electrically conductive components.

BACKGROUND

Because of the height reached by wind turbines and their location on elevated areas, they have a high risk of receiving lightning strikes particularly at its blades. Therefore the blades must have a lightning protection system and any additional system installed in them containing conductive elements (metal parts, sensors, beacon systems, etc.) must be protected against direct lightning strikes and indirect effects due to the electromagnetic field induced by them.

The primary components of lightning protection system for wind turbine blades are a series of metal receptors mounted on the surface of the blade and a down conductor to drive the lightning from the receptors to the blade root. The evolution in wind turbines development together with the growth of the power provided by them has led to new generations of wind turbines having increasing dimensions both in tower height and rotor diameter. Blade lengthening involves an increase in rigidity. The use of more carbon fiber laminates in the manufacturing of blades is a conventional way to achieve this rigidity whether as "caps" joined to the shells or forming part of the shell structure. However, carbon fiber laminates are conductors and must therefore be connected in parallel with the down conductor of the lightning protection system to prevent internal arcing between the down conductor and the laminates as well as direct lightning strikes on the carbon laminates.

WO 2006/051147 A1 describes a lightning protection system comprising means for equipotentializing the carbon fiber laminates with the lightning protection system including derivations from the down conductor to connect it directly to the carbon fiber laminates arranged in the upper and lower parts of the beam of the blade (see FIG. 1a). An auxiliary cable 5 derived from down-conductor 6 is connected by a bolted joint to a metal plate 3 in direct contact with the carbon fiber layers of the beam flanges 4 that serves as a means for injecting current into them. The electrical connection can be improved by using conductive resins shaped as carbon nanofibers or nanotubes 11 added both between the metal plate 3 and the carbon fiber layers as in the vicinity of the metal plate 3. Because the high frequency of the lightning current, the local current distribution in the connection, causes that the effective connection area is less than the physical, being the current density much greater in area A near the auxiliary cable 5 that in area B far away from it.

The present invention is directed to solving that problem.

SUMMARY OF THE INVENTION

The invention provides a lightning protection system of a wind turbine blade whose shells include an electrically conductive component embedded into them having injection means of lightning currents in said conductive component that achieve a balanced distribution of the current in the injection zone.

Such injection means comprise a current receptor element of lightning currents arranged over an area of the shells close to the electrically conductive component and a current injection element arranged over the electrically conductive component that are connected between them by at least two distribution cables.

Such lightning currents may come from a ground down conductor that runs through the inside of the blade or from cables connected directly to blade lightning receptors.

In one embodiment, the conductive component is a "cap" embedded in a shell and the injection means comprise a current receptor element and a current injection element that are connected by two distribution cables and configured to prevent areas with high current density in the current injection element.

In one embodiment, the conductive component is a carbon fiber laminate embedded in a shell and the injection means comprise a current receptor element and a current injection element which are connected by three distribution cables and configured to prevent areas with high current density in the current injection element.

In one embodiment, the conductive component in a metal mesh embedded in a shell and the injection means comprise a current receptor element and a current injection element which are connected by four distribution cables and configured to prevent areas with high current density in the current injection element.

Other features and advantages of the present invention will be understood from the following detailed description in relation with the enclosed figures.

DETAILED DESCRIPTION OF THE INVENTION

Figure 1A:
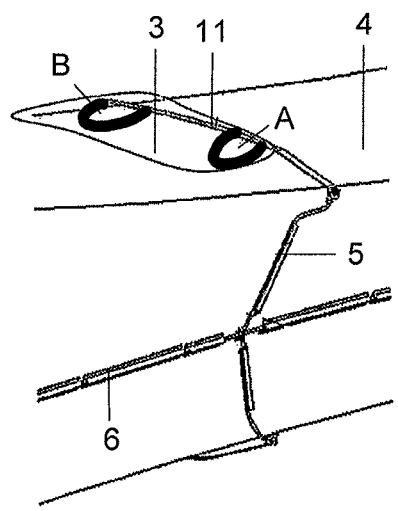
FIGS. 1a and 1b are, respectively, a perspective view and a schematic plan view of a known lightning protection system of a wind turbine blade showing how a lightning current is injected into a "cap" of the beam of the wind turbine blade.

The present invention relates to lightning protection systems of wind turbine blades whose shells include electrically conductive components and, in particular, shells of the following types:

shells incorporating "caps" made of carbon fiber laminates;

shells whose structure includes carbon fiber laminates (often called structural shells);

shells whose structure includes metal meshes, as in the case of shells with radar absorbing material.

In the first of the mentioned types, the typical lightning protection system comprises (see FIG. 1b) a down conductor cable 21 of lightning currents received by one or more lightning receptors typically located at the tip of the blade which runs through the inside of the blade 20, nearest, normally, to its trailing edge 23 than to its leading edge 25, connected to a metal plate 24 arranged over the "cap" 22 attached to the shell. The black square indicates the connection of the cable derived from the down conductor 21 with the metal plate 24 and the grey circumference of thick line the area of high current density.

In the embodiment of the invention illustrated in FIGS. 2a, 2b and 2c, the injection means of lightning currents derived from down conductor cable 21 via an auxiliary cable (hereinafter called input cable) in the "cap" 22 comprise a current receptor element 27 and a current injection element 28 (made for example of metal plates) connected by two distribution cables 31, 32 of greater inductance than the current receptor element. The current injection element 28 is arranged over the "cap" 22 and the current receptor element 27, connected to the input cable, is located in a close area to it, located preferably at a distance lesser than 5 m.

Figure 1B:
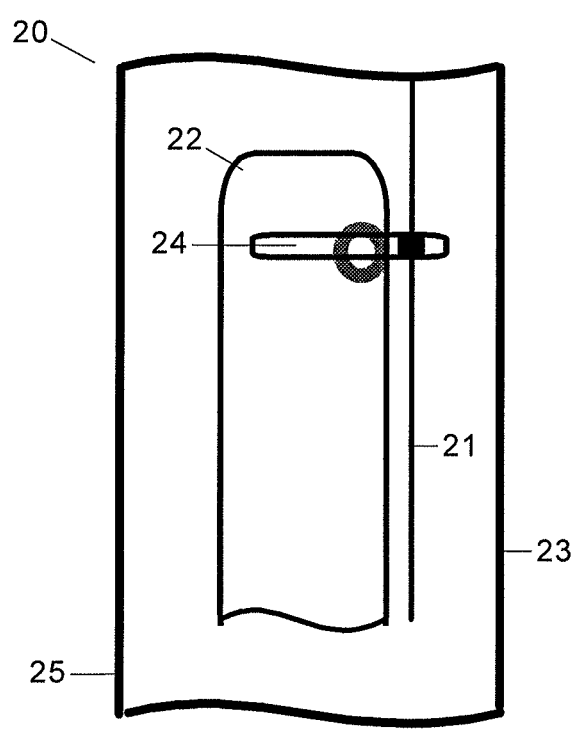

The configuration described allows improving the current distribution in the injection zone as indicated by the thickness of the grey circumferences compared with that of the circumference of FIG. 1b. The peak current can be reduced to half and, thus, the value of the electric field is reduced in the local injection area with the consequent reduction of the temperature increase.

Figure 2A:
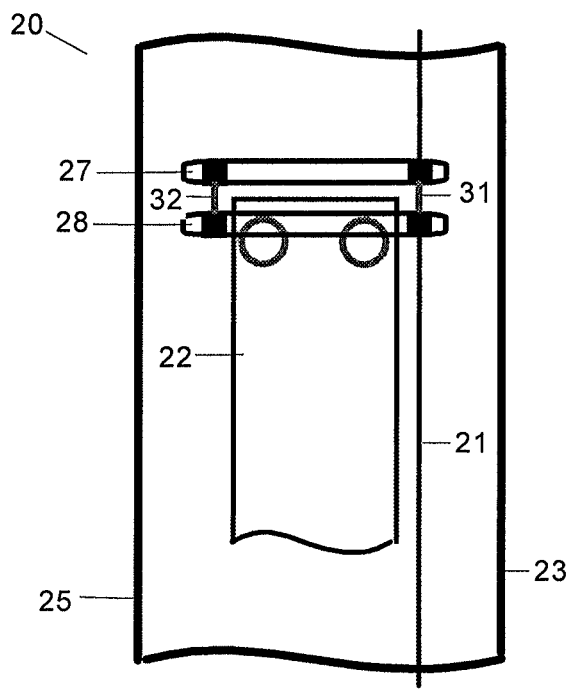
FIG. 2a is a schematic plan view of a lightning protection system of a wind turbine blade according to the invention showing how a lightning current is injected into a "cap" attached to a shell of a wind turbine blade.
Figure 2B:
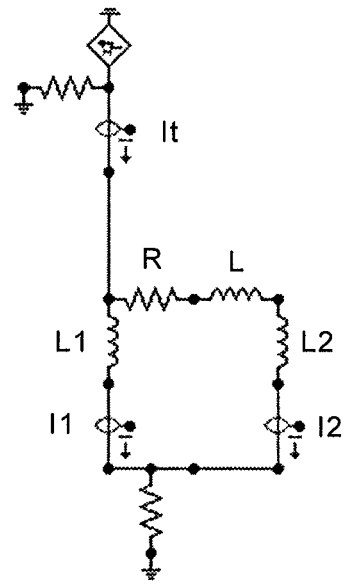
FIG. 2b is an electrical sketch of said current injection and FIG. 2c shows graphically the distribution of currents at characteristic frequencies of lightning (kHz).
Figure 2C:
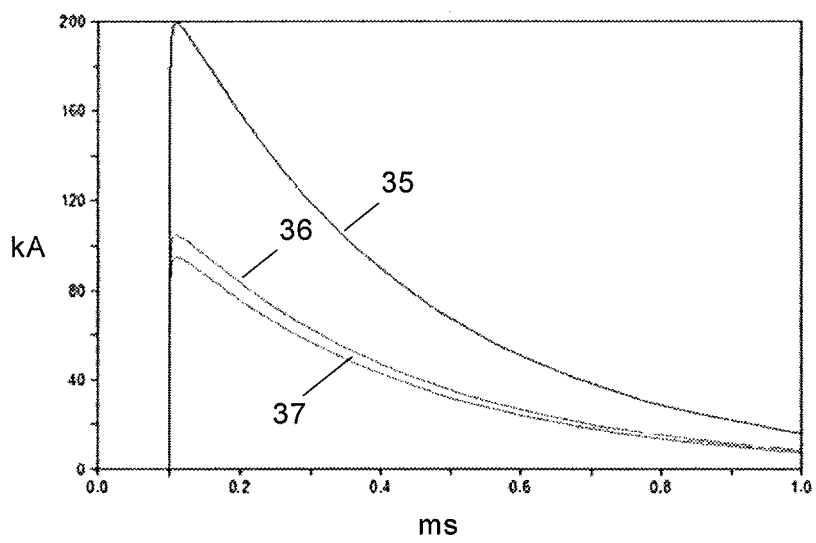

By performing a simulation of the electric sketch of FIG. 2b for a current receptor element 27 of an inductance L=0.1 µH (and resistance R) and two distribution cables 31, 32 of inductances L1=1 µH and L2=1 µH has being found that an almost equal distribution of the intensity of the lightning current It received by the current receptor element 27 between the currents I1 and I2 transmitted by distribution cables 31, 32 can be achieved as it is also shown in FIG. 2c: It curve 35, I1 and I2 curves 36, 37.

Figure 3A:
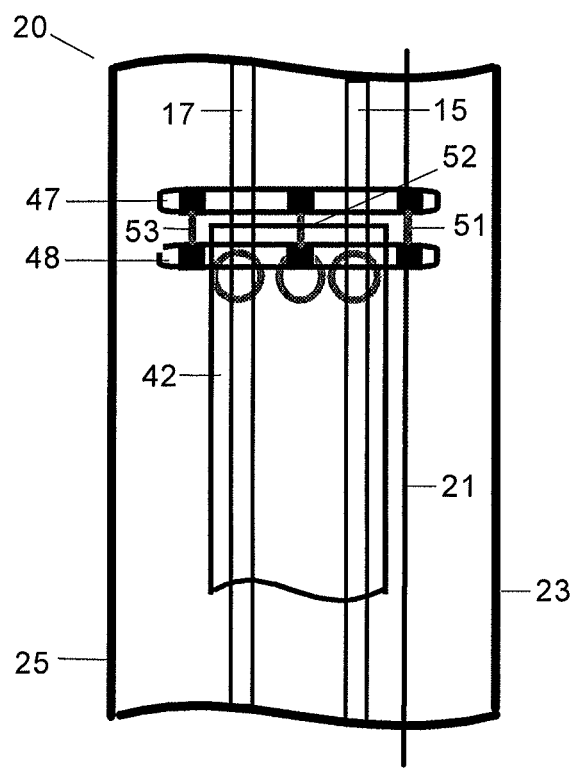
FIG. 3a is a schematic plan view of a lightning conductor system a wind turbine blade according to the invention showing how a lightning current is injected into carbon fiber a laminate of embedded in a shell of a wind turbine blade.
Figure 3B:
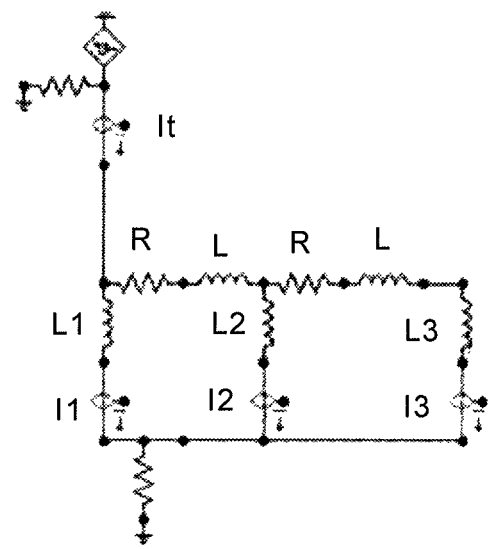
FIG. 3b is an electrical sketch of said current injection and FIG. 3c shows graphically the distribution of currents at characteristic frequencies of lightning (kHz).
Figure 3C:
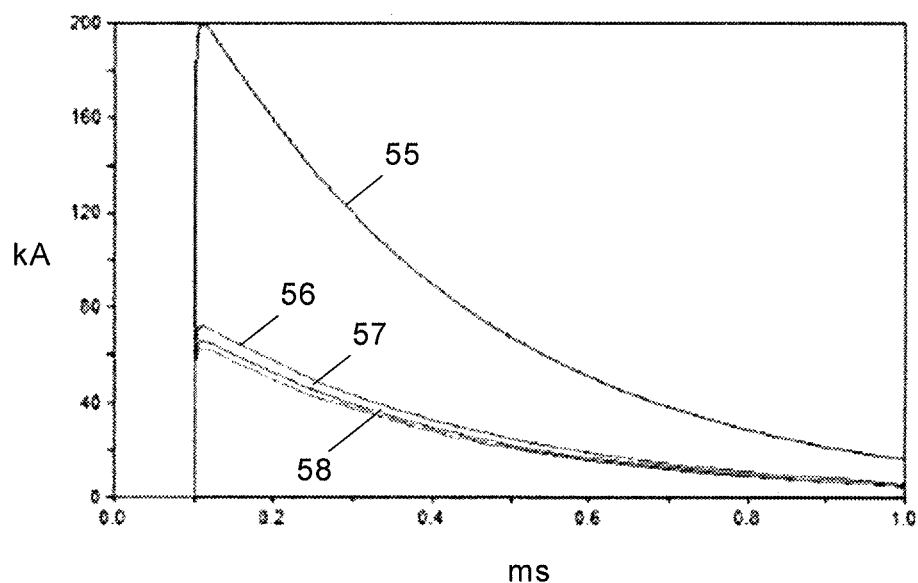

In the embodiment of the invention illustrated in FIGS. 3a, 3b and 3c, applicable to a wind turbine blade 20 with structural shells and beams 15, 17, the injection means of lightning currents transmitted by the input cable on the carbon fiber laminate 42 of a shell comprise a current receptor element 47 and a current injection element 48 (made for example of metal plates) connected by three distribution cables 51, 52, 53 (because the carbon fiber laminate 42 normally has a greater width than the "cap" 22 of FIG. 2a) of greater inductance than current receptor element 47. The current injection element 48 is arranged over the carbon fiber laminate 42 and the current receptor element 27, connected to the cable input, is located in a close area to it.

This configuration improves the current distribution in the injection area analogously to the above embodiment.

Performing a simulation of the electrical sketch of FIG. 3b for a current receptor element 47 of inductance L=0.1 µH (and resistance R) and distribution cables 51, 52, 53 of inductances L1=1 µH, L2=1 µH y L3=1 µH has been found that an almost equal distribution of the intensity of the lightning current It received by the current receptor element 27 between the currents I1, I2 and I3 transmitted by distribution cables 51, 52, 53 can be achieved as it is also shown in FIG. 3c: It curve 55, I1, I2 and I3 curves 56, 57, 58.

Figure 4A:
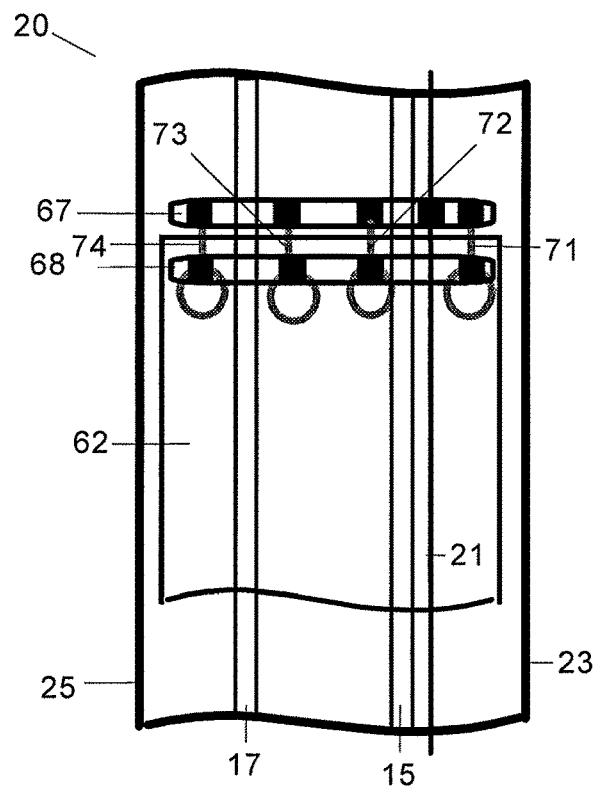
FIGS. 4a and 4b are schematic plan views of a lightning protection system of a wind turbine blade according to the invention showing how a lightning current is injected into a metal mesh integrated in a shell of the wind turbine blade.

In the embodiment of the invention illustrated in FIG. 4a, applicable to a wind turbine blade 20 with shells including a metal mesh 62 (which is part of a radar absorbing structure) and beams 15, 17, the injection means of lightning currents transmitted by the input cable in the metal mesh 62 comprise a current receptor element 67 and a current injection element 68 (made for example of metal plates) connected by four distribution cables 71, 72, 73, 74 (because the metal mesh 62 normally have a greater width than the "cap" 22 of FIG. 2a and the carbon fiber laminate of FIG. 3a) of greater inductance than the current receptor element 67.

The current injection element 68 is arranged over the metal mesh 62 and the current receptor element 67, connected to the cable input, is located in a close area to it.

This configuration improves the current distribution in the injection area analogously to the above embodiment as illustrated by the grey circumferences of FIG. 4a indicating the area of maximum density or "influence" of the injection element.

Figure 4B:
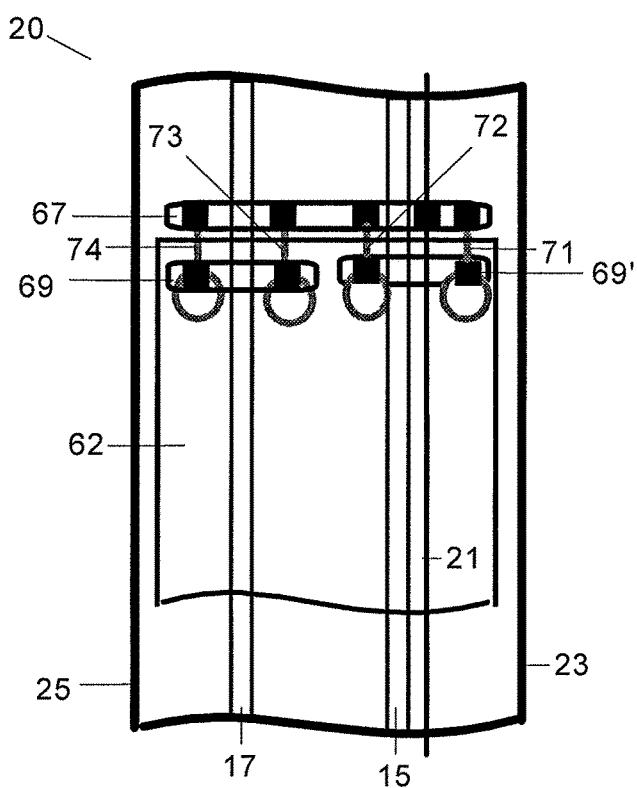

The embodiment illustrated in FIG. 4b it is similar to that of FIG. 4a. The only difference is that instead of a current injection element 68 two current injection elements 69, 69' are used.

All the above is also applicable when the input cable is a cable connected directly to a lightning receptor as can happen in the case of lightning protection systems that, in addition to typical lightning receptors located on the tip of the blade connected to a down conductor such as the represented in the Figures with number 21, also include lateral lightning receptors in certain transverse sections of the blade.

Among the advantages of the invention it can be highlighted that:

The effective area of current transmission is increased.

The local voltage is reduced at the injection areas.

The temperature increase in the material is reduced (ensuring structural integrity).

Another significant advantage is that the lightning protection system of the invention can be installed in shells manufactured by infusion procedures as the system injection means can be arranged in corresponding locations during the manufacture of each of the shells of the blade and make the proper connections during assembly of the blade. Since, in particular, in that process the beams 15, 17 must be "joined" to the shells is particularly advantageous to use injection means such as metal plates, which can be "pressed" by the flanks of the beams 15, 17. That would not be possible with cables (they would be broken).

The invention is especially applicable to offshore carbon blades since the amount of current is much higher and therefore need improvements of systems currently used for injecting current into "caps" and also to "stealth" blades requiring improvements in their current injection systems.

Although the present invention has been described in connection with various embodiments, it will be appreciated from the specification that various combinations of elements, variations or improvements therein may be made, and are within the scope of the invention as defined by the appended claims.

The invention claimed is:

1. A lightning protection system of a wind turbine blade, whose shells include at least one electrically conductive component embedded into the shell, comprising injection means of lightning currents in said electrically conductive component upon receipt through an input cable connected directly or indirectly with one or more lightning receptors of the blade, wherein said injection means of lightning currents comprise:

a current receptor element connected to said input cable and arranged over an area of the shells close to the electrically conductive component; and a current injection element arranged over the electrically conductive component and connected to the current receptor element by at least two distribution cables, wherein the electrically conductive component is a metal mesh and the injection means comprise said current receptor element and two current injection elements that are connected by four distribution cables and are configured to achieve a distribution of currents in said distribution cables that prevents areas with a high current density in the current injection elements.

2. The lightning protection system according to claim 1, wherein said input cable is a cable derived from a down conductor disposed within the wind turbine blade for carrying lightning currents to ground.

3. The lightning protection system according to claim 1, wherein said input cable is connected directly to a blade lightning receptor.

4. The lightning protection system according to claim 1, wherein the distance between the current receptor element and the current injection elements is less than 5 m.

5. The lightning protection system according to claim 1, wherein the current receptor element and the current injection elements are metal plates.

\* \* \* \* \*